(12) United States Patent
Chen et al.

(10) Patent No.: US 9,360,949 B2
(45) Date of Patent: *Jun. 7, 2016

(54) HUMAN INTERFACE DEVICE

(75) Inventors: Yu Han Chen, Hsin-Chu (TW); Chia Cheun Liang, Hsin-Chu (TW); Hsiang Sheng Liu, Hsin-Chu (TW); Chih Yen Wu, Hsin-Chu (TW); Chien Jung Huang, Hsin-Chu (TW); Chih Chung Tsai, Hsin-Chu (TW); Ming Tsan Kao, Hsin-Chu (TW)

(73) Assignee: PIXART IMAGING INC, Hsin-Chu (TW)

( * ) Notice: Subject to any disclaimer, the term of this patent is extended or adjusted under 35 U.S.C. 154(b) by 131 days.

This patent is subject to a terminal disclaimer.

(21) Appl. No.: 13/466,351

(22) Filed: May 8, 2012

(65) Prior Publication Data

US 2013/0050083 A1  Feb. 28, 2013

(30) Foreign Application Priority Data

Aug. 24, 2011  (TW) .............................. 100130227 A

(51) Int. Cl.
*G06F 3/038* (2013.01)
*G06F 3/033* (2013.01)
*G09G 5/00* (2006.01)

(52) U.S. Cl.
CPC . *G06F 3/033* (2013.01); *G09G 5/00* (2013.01)

(58) Field of Classification Search
None
See application file for complete search history.

(56) References Cited

U.S. PATENT DOCUMENTS

| | | | | |
|---|---|---|---|---|
| 5,488,323 A | * | 1/1996 | Beacham et al. | 327/74 |
| 5,771,038 A | * | 6/1998 | Wang | 345/163 |
| 6,163,289 A | * | 12/2000 | Ginetti | 341/145 |
| 6,515,642 B1 | * | 2/2003 | Lin | 345/87 |
| 6,708,190 B1 | * | 3/2004 | Jones et al. | 708/230 |
| 7,307,898 B2 | * | 12/2007 | Ng et al. | 365/189.09 |
| 8,564,335 B1 | * | 10/2013 | Weiser | 327/112 |
| 2008/0119151 A1 | * | 5/2008 | Hsieh et al. | 455/230 |
| 2009/0072863 A1 | * | 3/2009 | Chiang et al. | 326/113 |
| 2012/0050208 A1 | * | 3/2012 | Dietz | 345/174 |
| 2012/0229163 A1 | * | 9/2012 | Jansen et al. | 326/38 |

FOREIGN PATENT DOCUMENTS

TW  200729718 A  8/2007

* cited by examiner

*Primary Examiner* — Amr Awad
*Assistant Examiner* — Donna Lui
(74) *Attorney, Agent, or Firm* — Hauptman Ham, LLP

(57) ABSTRACT

There is provided a human interface device including a control chip and a plurality of control components. The control chip includes a voltage detection circuit coupled to the plurality of control components via a multiplexing pin and detects a voltage value on the multiplexing pin through the voltage detection circuit thereby identifying an operating state of the plurality of control components.

10 Claims, 6 Drawing Sheets

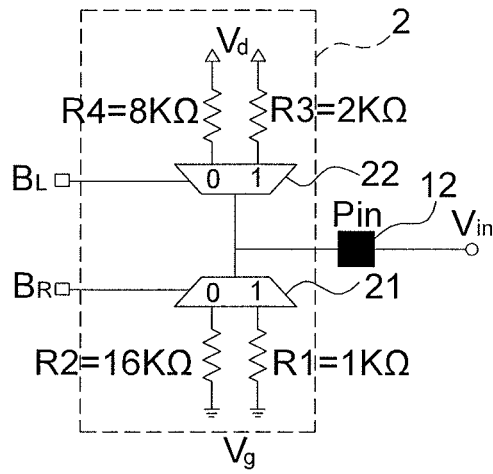
FIG. 3A
| $B_L$ | $B_R$ | $V_{in}$ | |
|---|---|---|---|
| 0 | 0 | $V_d * R2/(R2+R4)$ | $(2/3)V_d$ |
| 0 | 1 | $V_d * R1/(R1+R4)$ | $(1/9)V_d$ |
| 1 | 0 | $V_d * R2/(R2+R3)$ | $(8/9)V_d$ |
| 1 | 1 | $V_d * R1/(R1+R3)$ | $(1/3)V_d$ |
FIG. 3B
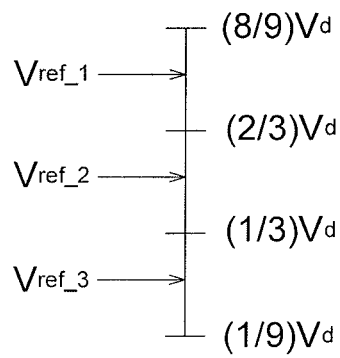
FIG. 3C

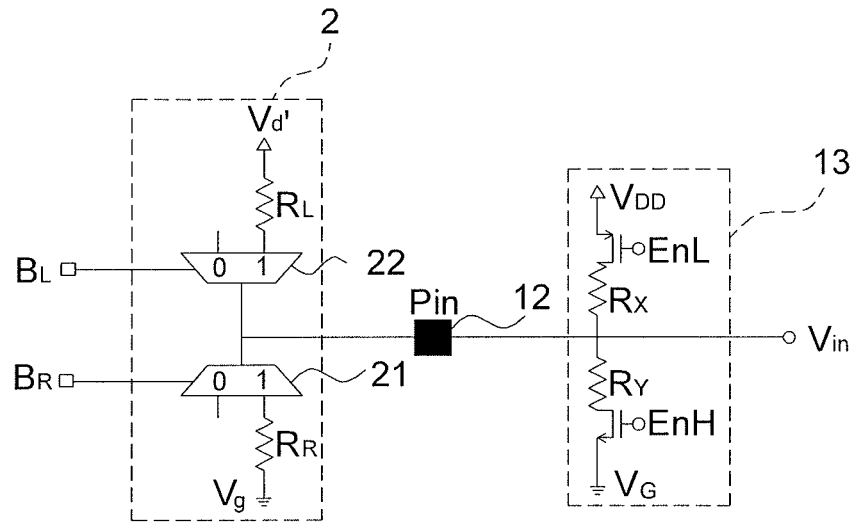
FIG. 6A
| B_L | B_R | V_in |
|---|---|---|
| 0 | 0 | $V_{DD}$ if (EnL,EnH)=(0,0) <br> 0 if (EnL,EnH)=(1,1) |
| 0 | 1 | ~0 |
| 1 | 0 | ~$V_d'$ |
| 1 | 1 | ~(1/2)$V_d'$ |
FIG. 6B
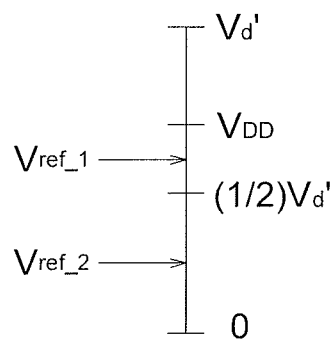
FIG. 6C

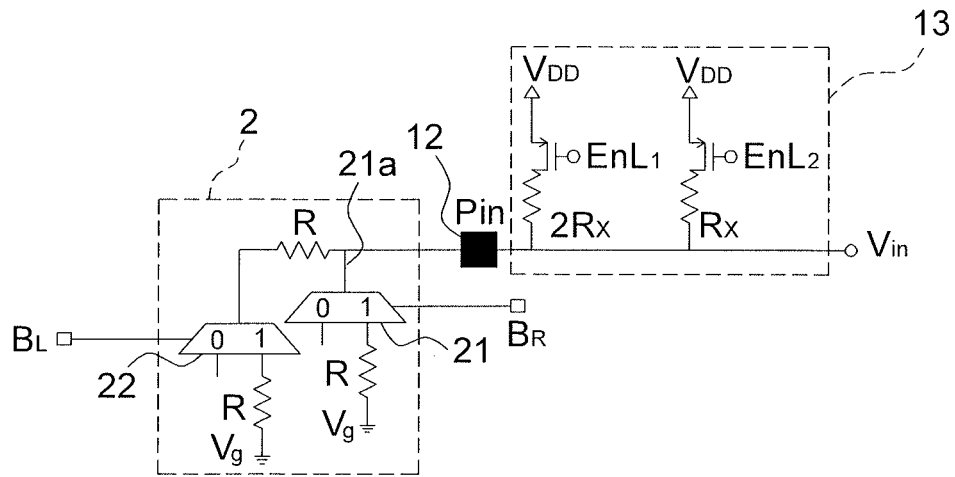
FIG. 7A
| $B_L$ | $B_R$ | $R_{eq}$ |
|---|---|---|
| 0 | 0 | infinity |
| 0 | 1 | R |
| 1 | 0 | 2R |
| 1 | 1 | (2/3)R |
FIG. 7B
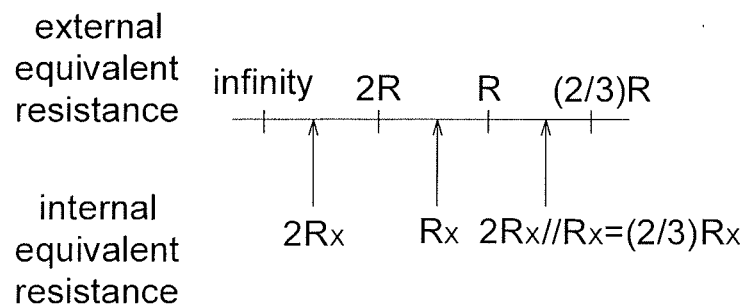
FIG. 7C

HUMAN INTERFACE DEVICE

CROSS REFERENCE TO RELATED APPLICATION

This application claims the priority benefit of Taiwan Patent Application Serial Number 100130227, filed on Aug. 24, 2011, the full disclosure of which is incorporated herein by reference.

BACKGROUND

1. Field of the Disclosure

This disclosure generally relates to a human interface device and, more particularly, to a human interface device in which a plurality of control components shares one multiplexing pin of a control chip thereof.

2. Description of the Related Art

A human interface device generally includes a plurality of control components in order to fulfill various requirements; for example, the human interface device can include a plurality of keys corresponding to respective operating states. Therefore, the human interface device general further includes a control chip configured to detect the operating states to accordingly control an operation of an electronic device coupled thereto.

The control chip of conventional human interface devices generally has a plurality of pins configured to detect respective trigger states of different control components so as to detect different operating states. For example, FIG. 1 shows a conventional mouse chip 9 including a pin L, a pin M and a pin R respectively configured to detect a pressing state of the left key, middle key and right key of a mouse. However, more pins can increase the manufacturing cost of the human interface device. But if the pin number is limited in order to reduce the manufacturing cost, operating functions of the human interface device can be limited.

Accordingly, the present disclosure provides a human interface device in which a plurality of control components shares one multiplexing pin of a control chip thereof so as to effectively reduce the pin number of the control chip and the manufacturing cost and to maintain enough operating functions simultaneously.

SUMMARY

It is an object of the present disclosure to provide a human interface device in which a plurality of control components shares one multiplexing pin of the control chip thereof.

It is another object of the present disclosure to provide a human interface device that may detect different operating states of a plurality of control components by means of detecting a voltage value on one multiplexing pin of the control chip thereof.

The present disclosure provides a human interface device including a control chip and an external circuitry. The control chip includes a multiplexing pin and a voltage detection circuit, wherein the voltage detection circuit is configured to detect a voltage value on the multiplexing pin and to control an operation of the human interface device according to the voltage value. The external circuitry is coupled to between a plurality of control components and the multiplexing pin and outputs different voltage values according to different operating states of the plurality of control components.

The present disclosure further provides a human interface device including a control chip and an external circuitry. The control chip includes a multiplexing pin, a voltage detection circuit and an internal circuitry. The voltage detection circuit is configured to detect a voltage value and to control an operation of the human interface device according to the voltage value. The internal circuitry is coupled to the multiplexing pin and outputs the voltage value. The external circuitry is coupled to a plurality of control components and the multiplexing pin, wherein the voltage value is determined according to different operating states of the plurality of control components coupled to the external circuitry and different detection states of the internal circuitry.

The present disclosure further provides a human interface device including a control chip and an external circuitry. The control chip includes a multiplexing pin and a voltage detection circuit, wherein the voltage detection circuit is configured to detect a voltage value on the multiplexing pin and to control an operation of the human interface device according to the voltage value. The external circuitry is coupled to a plurality of control components and the multiplexing pin, wherein the multiplexing pin is coupled to a first voltage source or a first ground voltage via a voltage drop or is floating according to different operating states of the plurality of control components thereby having different voltage values.

The human interface device of the present disclosure further includes an internal circuitry coupled to the multiplexing pin of the human interface device, wherein the voltage value is determined according to different operating states of the control components and different detection states of the internal circuitry. The control chip controls the detection states of the internal circuitry within a detection interval to couple the multiplexing pin to a second voltage source and a second ground voltage respectively via a resistor, or to the second voltage source respectively via different resistors.

The human interface device of the present disclosure may be a mouse. The control components may be mouse keys, mouse rollers, touch control devices or combinations thereof.

In the human interface device of the present disclosure, the control chip stores at least one voltage threshold, and the control chip controls the operation of the human interface device according to a comparison result of comparing the voltage value detected by the voltage detection circuit and the voltage threshold.

BRIEF DESCRIPTION OF THE DRAWINGS

Other objects, advantages, and novel features of the present disclosure will become more apparent from the following detailed description when taken in conjunction with the accompanying drawings.

FIG. 3A shows a circuit diagram of the external circuitry of the human interface device according to the first embodiment of the present disclosure.

FIGS. 3B and 3C show operational schematic diagrams of the human interface device shown in FIG. 3A.

FIG. 6A shows a circuit diagram of the external circuitry and the internal circuitry of the human interface device according to the second embodiment of the present disclosure.

FIGS. 6B and 6C show operational schematic diagrams of the human interface device shown in FIG. 6A.

FIG. 7A shows another circuit diagram of the external circuitry and the internal circuitry of the human interface device according to the second embodiment of the present disclosure.

FIGS. 7B and 7C show operational schematic diagrams of the human interface device shown in FIG. 7A.

DETAILED DESCRIPTION OF THE EMBODIMENT

It should be noted that, wherever possible, the same reference numbers will be used throughout the drawings to refer to the same or like parts.

Figure 1:
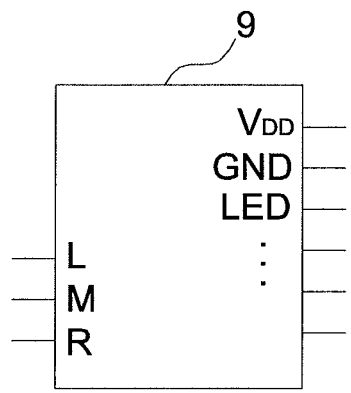
FIG. 1 shows a schematic block diagram of a conventional mouse chip.
Figure 2:
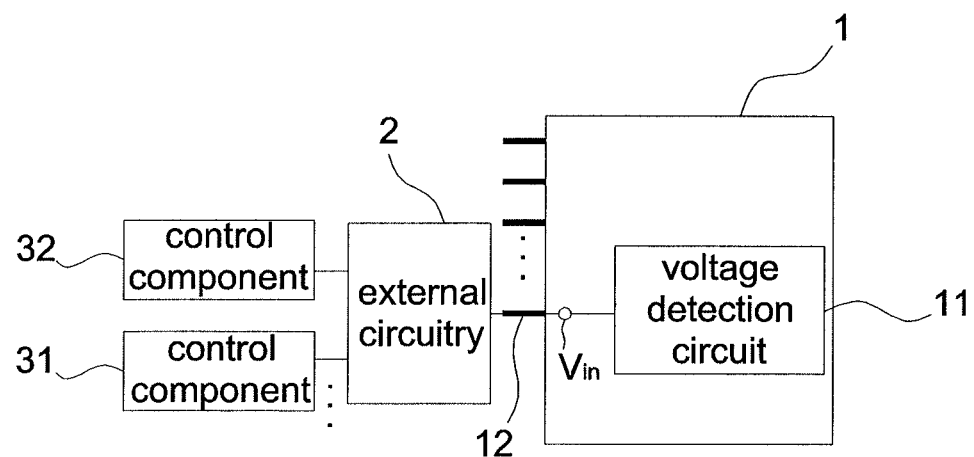
FIG. 2 shows a schematic block diagram of the human interface device according to the first embodiment of the present disclosure.

Please refer to FIG. 2, it shows a schematic block diagram of the human interface device according to the first embodiment of the present disclosure, and the human interface device may be, for example, a mouse. The human interface device includes a control chip 1, an external circuitry 2 and a plurality of control components 31, 32, .... The control chip 1 includes a voltage detection circuit 11 and a multiplexing pin 12. The voltage detection circuit 11 is configured to detect a voltage value Vin on the multiplexing pin 12 and to control an operation of the human interface device according to the voltage value Vin, wherein the control chip 1 may be a mouse chip. The external circuitry 2 is coupled to between the plurality of control components 31, 32, ... and the multiplexing pin 12 so as to output different voltage values to the multiplexing pin 12 according to different operating states of the plurality of control components 31, 32, .... The control components 31, 32, ... may be, for example, mouse keys, mouse rollers, touch control devices or combinations thereof, but not limited thereto. In addition, although two control components 31, 32 are shown in FIG. 2, the present disclosure is not limited thereto.

Please refer to FIGS. 3A to 3C, FIG. 3A shows a circuit diagram of the external circuitry 2 of the human interface device according to the first embodiment of the present disclosure; FIGS. 3B and 3C show operational schematic diagrams of the human interface device shown in FIG. 3A.

The external circuitry 2 includes a first multiplexer 21, a second multiplexer 22, a first resistor R1, a second resistor R2, a third resistor R3 and a fourth resistor R4. The multiplexing pin 12 is coupled to a connection point of the first multiplexer 21 and the second multiplexer 22. The first resistor R1 is coupled to between the logic input "1" of the first multiplexer 21 and a ground voltage Vg; and the second resistor R2 is coupled to between the logic input "0" of the first multiplexer 21 and the ground voltage Vg. The third resistor R3 is coupled to between the logic input "1" of the second multiplexer 22 and a voltage source Vd; and the fourth resistor R4 is coupled to between the logic input "0" of the second multiplexer 22 and the voltage source Vd. The first multiplexer 21 may be controlled by a key $B_R$ (e.g. the control component 31) and the second multiplexer 22 may be controlled by a key $B_L$ (e.g. the control component 32). For example, when the keys $B_R$ and $B_L$ are pressed, the logic inputs "1" of the first multiplexer 21 and the second multiplexer 22 conduct; and when the keys $B_R$ and $B_L$ are not pressed, the logic inputs "0" conduct. The resistors R1 to R4 may have different resistances (as shown in FIG. 3A) such that the control components may form different conducting paths in different operating states so as to output different voltage values for being identified. It is appreciated that the conducting states of the multiplexers and the resistance of the resistors in the present embodiment are only exemplary.

FIG. 3B shows the voltage values Vin on the multiplexing pin 12, which may be obtained using voltage division, corresponding to different operating states of the control components. For example, when the keys $B_R$ and $B_L$ are not pressed, the logic inputs "0" of the multiplexers 21 and 22 conduct, and the multiplexing pin 12 is coupled to the ground voltage Vg via the second resistor R2 and to the voltage source Vd via the fourth resistor R4. Therefore, the voltage value Vin on the multiplexing pin 12 is calculated as (⅔)Vd using the voltage division of the second resistor R2 and the fourth resistor R4. In addition, the voltage value Vin in other operating states of the keys $B_R$ and $B_L$ may also be obtained according to similar method, and the obtained voltage values are shown in FIG. 3B. Since the voltage value Vin has four different variations respectively corresponding to different operating states of the control components, three voltage thresholds, e.g. $V_{ref\_1}$, $V_{ref\_2}$, $V_{ref\_3}$ as shown in FIG. 3C, may be preferably stored in the control chip 1 previously. The control chip 1 may control an operation of the human interface device according to a comparison result of comparing the voltage value Vin detected by the voltage detection circuit 11 and the voltage thresholds, wherein said operation may be, but not limited to, those associated with conventional mouse keys.

In this embodiment, the control chip 1 may identify an operating state of a plurality of control components 31, 32, ... according to a voltage value Vin detected by the voltage detection circuit 11, and the external circuitry 2 needs an external voltage source Vd.

Figures 4A, 4B:
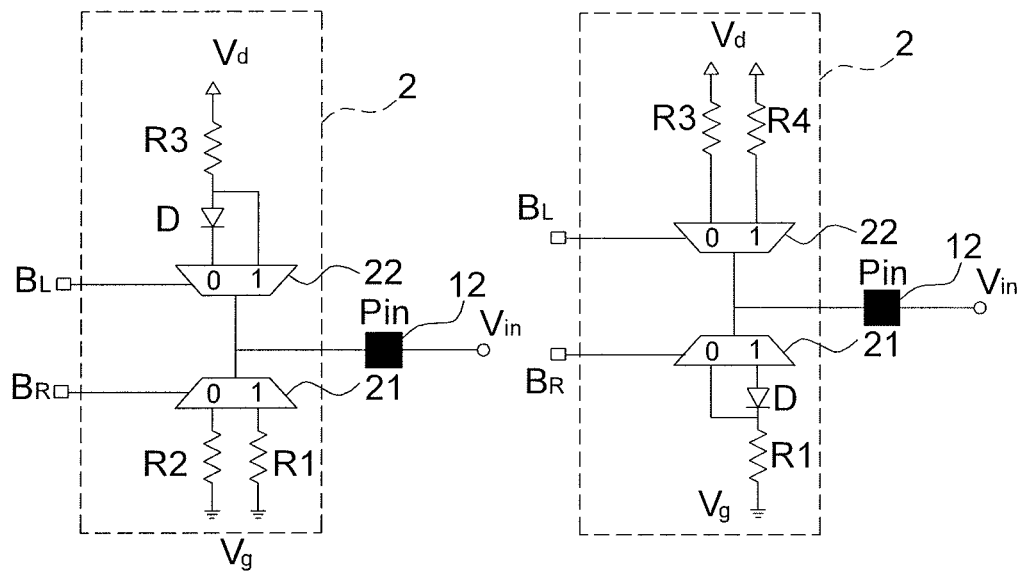
FIGS. 4A and 4B show alternative circuit diagrams of the external circuitry of the human interface device according to the first embodiment of the present disclosure.

In the first embodiment of the present disclosure, one of the resistors R1 and R2 in the external circuitry 2 may be replaced by a diode and/or one of the resistors R3 and R4 may be replaced by a diode as shown in FIGS. 4A and 4B. In this manner, when the first multiplexer 21 and the second multiplexer 22 are in different conducting states, the multiplexing pin 12 may be coupled to the voltage source Vd or the ground voltage Vg via different voltage drops so as to output different voltage values for being identified by the control chip 1.

For example in FIG. 4A, the first multiplexer 21 is under control of the first control component $B_R$ (e.g. 31) to couple the multiplexing pin 12 to the ground voltage Vg via the first resistor R1 or the second resistor R2. The second multiplexer 22 is under control of the second control component $B_L$ (e.g. 32) to couple the multiplexing pin 12 to the voltage source Vd via the third resistor R3 or via a diode D and the third resistor R3 connected in series. In this manner, different voltage values Vin may also be outputted corresponding to different conducting states of the multiplexers.

For example in FIG. 4B, the first multiplexer 21 is under control of the first control component $B_R$ (e.g. 31) to couple the multiplexing pin 12 to the ground voltage Vg via the first resistor R1 or via a diode D and the first resistor R1 connected in series. The second multiplexer 22 is under control of the second control component $B_L$ (e.g. 32) to couple the multiplexing pin 12 to the voltage source Vd via the third resistor R3 or the fourth resistor R4. In this manner, different voltage values Vin may also be outputted corresponding to different conducting states of the multiplexers. In other embodiments, it is able to use a diode to replace the second diode R2 (as shown in FIG. 4B) and to use another diode to replace the fourth resistor R4 (as shown in FIG. 4A) simultaneously as long as the multiplexing pin 12 may be coupled to the voltage source Vd or the ground voltage Vg via a voltage drop.

Figure 5:
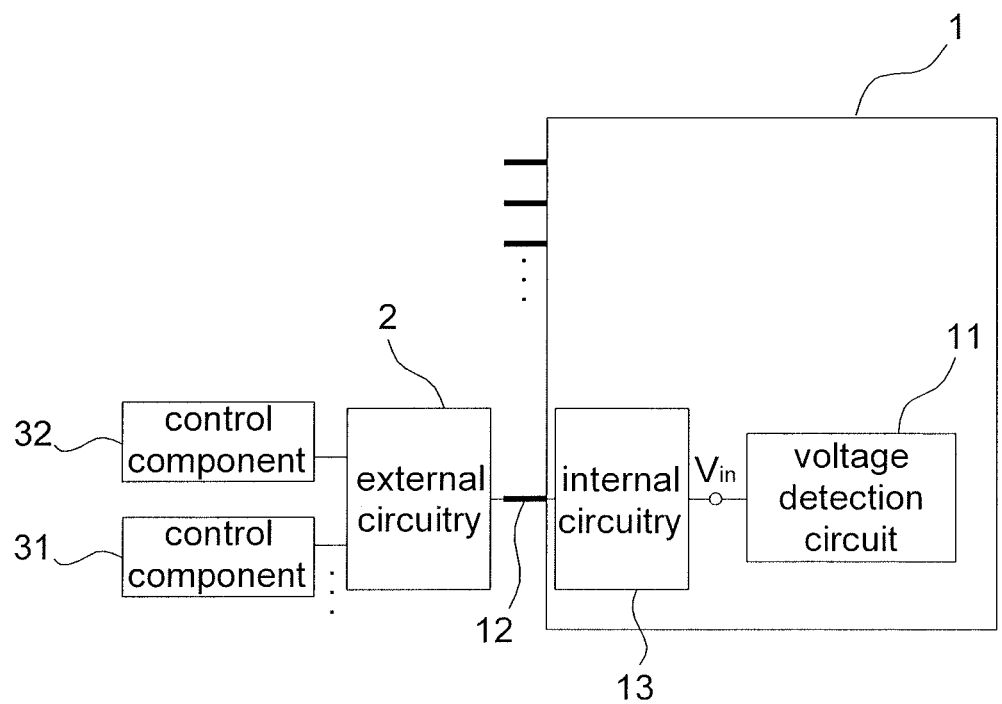
FIG. 5 shows a schematic block diagram of the human interface device according to the second embodiment of the present disclosure.

Please refer to FIG. 5, it shows a schematic block diagram of the human interface device according to the second embodiment of the present disclosure, and the human interface device may be, for example, a mouse. The human interface device includes a control chip 1, an external circuitry 2 and a plurality of control components 31, 32, . . . . The control chip 1 includes a voltage detection circuit 11, a multiplexing pin 12 and an internal circuitry 13. The voltage detection circuit 11 is configured to detect a voltage value Vin and to control an operation of the human interface device according to the voltage value Vin. The internal circuitry 13 is coupled to the multiplexing pin 12 and outputs the voltage value Vin, wherein the control chip 1 may be, for example, a mouse chip. The external circuitry 2 is coupled to between the plurality of control components 31, 32, . . . and the multiplexing pin 12, wherein the voltage value Vin may be determined according to different operating states of the control components 31, 32, . . . coupled to the external circuitry 2 and different detection states of the internal circuitry 13. The control components may be, for example, mouse keys, mouse rollers, touch control devices or combinations thereof.

Please refer to FIGS. 6A to 6C, FIG. 6A shows a circuit diagram of the external circuitry 2 and the internal circuitry 13 of the human interface device according to the second embodiment of the present disclosure; FIGS. 6B and 6C show operational schematic diagrams of the human interface device in FIG. 6A.

The external circuitry 2 includes a first multiplexer 21, a second multiplexer 22, a first resistor $R_R$ and a second resistor $R_L$. The multiplexing pin 12 is coupled to a connection point of the first multiplexer 21 and the second multiplexer 22. The first resistor $R_R$ is coupled to between the logic input "1" of the first multiplexer 21 and a ground voltage Vg, and the logic input "0" of the first multiplexer 21 is floating. The second resistor $R_L$ is coupled to between the logic input "1" of the second multiplexer 22 and a first voltage source Vd', and the logic input "0" of the second multiplexer 22 is floating. The first multiplexer 21 may be controlled by a key $B_R$ (e.g. the control component 31) and the second multiplexer 22 may be controlled by a key $B_L$ (e.g. the control component 32). For example, when the keys $B_R$ and $B_L$ are pressed, the logic inputs "1" of the first multiplexer 21 and the second multiplexer 22 conduct; and when the keys $B_R$ and $B_L$ are not pressed, the logic inputs "0" conduct. The resistors $B_R$ and $B_L$ have substantially identical resistances. In this embodiment, the conducting states of the multiplexers and the resistance of the resistors are only exemplary.

The internal circuitry 13 includes a first control switch EnH, a third resistor $R_Y$, a second control switch EnL and a fourth resistor $R_X$. The control chip 1 controls the first control switch EnH and/or the second control switch EnL to conduct within one detection interval so as to control a detection state of the internal circuitry 13. In different detection states, the multiplexing pin 12 is coupled to a ground voltage $V_G$ via the third resistor $R_Y$ and the first control switch EnH, or coupled to a second voltage source $V_{DD}$ via the fourth resistor $R_X$ and the second control switch EnL. The resistors $R_X$ and $R_Y$ may have substantially identical resistances which are much larger than the resistance of the resistors $R_L$ and $R_R$ of the external circuitry 2, and an actual resistance difference therebetween may be determined according to the manufacturing process. The second voltage source $V_{DD}$ is preferably smaller than the first voltage source Vd'.

FIG. 6B shows the voltage values Vin, which may also be obtained using voltage division, corresponding to different operating states of the control components and different detection states of the internal circuitry 13. For example, when the keys $B_R$ and $B_L$ are not pressed, the logic inputs "0" of the multiplexers 21 and 22 conduct and thus the multiplexing pin 12 is floating; meanwhile, the control chip 1 controls the first control switch EnH or the second control switch EnL to conduct. When only the first control switch EnH is turned on, i.e. (EnL,EnH)=(1,1), the voltage value Vin is substantially identical to 0; and when only the second control switch EnL is turned on, i.e. (EnL,EnH)=(0,0), the voltage value Vin is substantially equal to the second voltage $V_{DD}$. For example, when both the keys $B_R$ and $B_L$ are pressed, the logic inputs "1" of the multiplexers 21 and 22 conduct, the multiplexing pin 12 is coupled to the ground voltage Vg via the first resistor $R_R$ and coupled to the first voltage source Vd' via the second resistor $R_L$. As the resistance of the resistors $R_L$ and $R_R$ of the external circuitry 2 is much smaller than that of the resistors $R_X$ and $R_Y$ of the internal circuitry 13 (an actual difference may be determined according to the manufacturing process), the voltage value Vin on the multiplexing pin 12 may be calculated as Vd'/2 (when $R_X=R_Y$) using voltage division of the external circuitry 2. In addition, the voltage value Vin in other operating states of the keys $B_R$ and $B_L$ may be obtained according to similar method, and the obtained voltage values are shown in FIG. 6B. In this embodiment, although the voltage value Vin also has four variations corresponding to different operating states of the control components, only two voltage thresholds, e.g. $V_{ref\_1}$ and $V_{ref\_2}$ as shown in FIG. 6C, may be previously stored in the control chip 1 since the voltage value Vin is not a fixed value when both the control components 31 and 32 are not pressed. The control chip 1 controls an operation of the human interface device according to a comparison result of comparing the voltage value Vin detected by the voltage detection circuit 11 and the voltage thresholds.

In this embodiment, the control chip 1 may identify an operating state of a plurality of control components 31, 32, . . . according to a voltage value Vin detected by the voltage detection circuit 11, and the external circuitry 2 still needs an external voltage source Vd'.

Please refer to FIGS. 7A to 7C, FIG. 7A shows another circuit diagram of the external circuitry 2 and the internal circuitry 13 of the human interface device according to the second embodiment of the present disclosure; FIGS. 7B and 7C show operational schematic diagrams of the human interface device in FIG. 7A.

The external circuitry 2 includes a first multiplexer 21, a second multiplexer 22 and three resistors R having identical resistances. The multiplexing pin 12 is directly coupled to a multiplexing terminal 21a of the first multiplexer 21. The first multiplexer 21 is under control of a first control component $B_R$ to couple the multiplexing pin 12 to a ground voltage Vg via one of the resistors R or to float the multiplexing pin 12 without passing through any resistor R. The second multiplexer 22 is under control of a second control component $B_L$ to couple the multiplexing pin 12 to the ground voltage Vg via two of the resistors R or to float the multiplexing pin 12 via one of the resistors R. That is, one of the resistors R is coupled between the first multiplexer 21 and the second multiplexer 22. For example, when the keys $B_R$ and $B_L$ are pressed, the logic inputs "1" of the first multiplexer 21 and the second multiplexer 22 conduct; and when the keys $B_R$ and $B_L$ are not pressed, the logic inputs "0" conduct. In this embodiment, the conducting states of the multiplexers and the resistance of the resistors are only exemplary.

FIG. 7B shows the equivalent resistances of the external circuitry 2 corresponding to different operating states of the control components. For example, when the keys $B_R$ and $B_L$ are not pressed, the logic inputs "0" of the multiplexers 21 and 22 conduct and thus the multiplexing pin 12 is floating and the equivalent resistance is infinity. In addition, the equivalent resistances in other operating states of the keys $B_R$ and $B_L$ may be obtained according to similar method, and the obtained equivalent resistances are shown in FIG. 7B. The equivalent resistance has four variations corresponding to different operating states of the control components.

The internal circuitry 13 includes a first control switch EnL1, a third resistor $2R_X$, a second control switch EnL2 and a fourth resistor $R_X$, wherein the resistance of the third resistor is double of that of the fourth resistor. The control chip 1 controls the first control switch EnL1 and the second control switch EnL2 to operate in a sequence of (EnL1, EnL2)=(0,1), (1,0), (0,0) within one detection interval, i.e. (ON,OFF), (OFF,ON), (ON,ON), so as to control the detection state of the internal circuitry 13. In different detection states, the multiplexing pin 12 is coupled to a voltage source $V_{DD}$ via the third resistor $2R_X$ and the first control switch EnL1, or via the fourth resistor $R_X$ and the second control switch EnL2. When the conducting state of the first control switch EnL1 and the second control switch EnL2 is (0,1), the equivalent resistance of the internal circuitry 13 is $2R_X$; when the conducting state of the first control switch EnL1 and the second control switch EnL2 is (1,0), the equivalent resistance of the internal circuitry 13 is $R_X$; and when the conducting state of the first control switch EnL1 and the second control switch EnL2 is (0,0), the equivalent resistance of the internal circuitry 13 is $(\frac{2}{3})R_X$. It is appreciated that the conducting states of the control switches are determined by the type thereof and are not limited to this embodiment.

FIG. 7C shows the relation between the equivalent resistance of the external circuitry 2 and that of the internal circuitry 13. When the relation between the resistance R of the external circuitry 2 and the resistance $R_X$ of the internal circuitry 13 satisfies $(\frac{2}{3})R_X<R<R_X$ (preferably the internal resistance $R_X$ is a little larger than the external resistance R) and when the voltage detection circuit 11 detects that the voltage value Vin is larger than a half of $V_{DD}$, i.e. $Vin>(\frac{1}{2})V_{DD}$, within one detection interval, the equivalent resistance of the external circuitry 2 may be determined so as to identify the operating state of the control components 31 and 32. For example, when the voltage value Vin is detected to be larger than a half of $V_{DD}$ at (EnL1,EnL2)=(0,1), it means that the equivalent resistance of the external circuitry 2 is infinity; therefore, it is known that both the keys $B_R$ and $B_L$ are not pressed. When the voltage value Vin is detected to be larger than a half of $V_{DD}$ at (EnL1,EnL2)=(1,0), it means that the equivalent resistance of the external circuitry 2 is equal to 2R; therefore, it is known that the key $B_L$ is pressed but the key $B_R$ is not pressed. When the voltage value Vin is detected to be larger than a half of $V_{DD}$ at (EnL1,EnL2)=(0,0), it means that the equivalent resistance of the external circuitry 2 is equal to R; therefore, it is known that the key $B_L$ is not pressed but the key $B_R$ is pressed. When the voltage value Vin is not detected to be larger than a half of $V_{DD}$ within one detection interval, it means that the equivalent resistance of the external circuitry 2 is equal to $(\frac{2}{3})R$; therefore, it is known that both the keys $B_R$ and $B_L$ are pressed.

In this embodiment, the control chip 1 may identify an operating state of a plurality of control components 31 and 32 according a voltage value Vin detected by the voltage detection circuit 11, and no external voltage source is necessary to the external circuitry 2.

Figure 8:
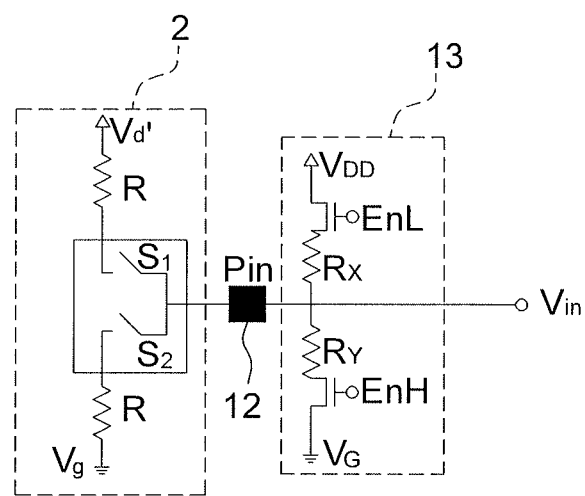
FIG. 8 shows another circuit diagram of the external circuitry and the internal circuitry of the human interface device according to the second embodiment of the present disclosure.

Please refer to FIG. 8, it shows another circuit diagram of the external circuitry 2 and the internal circuitry 13 of the human interface device according to the second embodiment of the present disclosure. The external circuitry 2 herein is a mechanical mouse roller circuit which includes two switches $S_1$ and $S_2$ coupled to a first voltage source Vd' and a ground voltage Vg respectively via a resistor R. When the roller is rolled forward or backward, the switches $S_1$ and $S_2$ can sequentially turn on or turn off, e.g. in a sequence of (ON, ON), (ON,OFF), (OFF,ON), and (OFF,OFF). The internal circuitry 13 includes a first control switch EnH, a third resistor $R_Y$, a second control switch EnL and a fourth resistor $R_X$. The control chip 1 controls the first control switch EnH and/or the second control switch EnL to conduct within one detection interval so as to control a detection state of the interval circuitry 13. In different detection states, the multiplexing pin 12 is coupled to a ground voltage $V_G$ via the third resistor $R_Y$ and the first control switch EnH, or coupled to a second voltage source $V_{DD}$ via the fourth resistor $R_X$ and the second control switch EnL. In this embodiment, the method that the control chip 1 identifies the operating state of the switches $S_1$ and $S_2$ according to the voltage value Vin detected by the voltage detection circuit 11 within one detection interval is similar to that of FIGS. 6A to 6C, and thus details thereof will not be repeated herein.

As mentioned above, conventional mouse chips detect the operating state of a plurality of control components through a plurality of pins and thus have a higher cost. The present disclosure further provides a human interface device (FIGS. 2 and 5) that may detect an operating state of a plurality of control components by detecting a voltage value on one multiplexing pin so as to reduce the manufacturing cost and to maintain enough operating functions.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:
1. A human interface device, comprising:
a first press key and a second press key;
a control chip comprising a multiplexing pin and a voltage detection circuit, wherein
the multiplexing pin is configured as an input terminal coupled to the voltage detection circuit in the control chip, and
the voltage detection circuit is configured to detect a voltage value on the multiplexing pin to accordingly identify states of the first press key and the second press key simultaneously according to one detected voltage value; and
an external circuitry coupled to the multiplexing pin via a node, the external circuitry comprising a first multiplexer having an output coupled to the node and a second multiplexer having an output coupled to the node, wherein
the first press key is coupled to a select input of the first multiplexer and the second press key is coupled to a select input of the second multiplexer,
two multiplexed inputs of the first multiplexer are respectively coupled to a ground voltage via a first voltage drop and a second voltage drop different from each other, and two multiplexed inputs of the second multiplexer are respectively coupled to a voltage source via a third voltage drop and a fourth voltage drop different from each other, wherein when the first press key and the second press key are not pressed, the node is coupled to the ground voltage via the first voltage drop and coupled to the voltage source via the third voltage drop to form a first voltage value on the multiplexing pin, when the first press key is pressed and the second press key is not pressed, the node is coupled to the ground voltage via the second voltage drop and coupled to the voltage source via the third voltage drop to form a second voltage value on the multiplexing pin, when the first press key is not pressed and the second press key is pressed, the node is coupled to the ground voltage via the first voltage drop and coupled to the voltage source via the fourth voltage drop to form a third voltage value on the multiplexing pin, when the first press key and the second press key are pressed, the node is coupled to the ground voltage via the second voltage drop and coupled to the voltage source via the fourth voltage drop to form a fourth voltage value on the multiplexing pin, the control chip is configured to identify that the first press key and the second press key are not pressed when the voltage detection circuit detects the first voltage value on the multiplexing pin, the control chip is configured to identify that the first press key is pressed and the second press key is not pressed when the voltage detection circuit detects the second voltage value on the multiplexing pin, the control chip is configured to identify that the first press key is not pressed and the second press key is pressed when the voltage detection circuit detects the third voltage value on the multiplexing pin, and the control chip is configured to identify that the first press key and the second press key are pressed when the voltage detection circuit detects the fourth voltage value on the multiplexing pin.

2. The human interface device as claimed in claim 1, wherein each of the first, second, third and fourth voltage drops is formed
by a resistor, or
by a resistor and a diode connected in series.

3. The human interface device as claimed in claim 1, wherein the control chip is configured to store at least one voltage threshold, and the control chip is configured to compare the voltage value detected by the voltage detection circuit with the voltage threshold.

4. A human interface device, comprising:
a first press key and a second press key;
a control chip comprising:
a voltage detection circuit configured to detect a voltage value to accordingly identify states of the first press key and the second press key simultaneously according to one detected voltage value;
a multiplexing pin configured as one input terminal coupled to the voltage detection circuit in the control chip, and
an internal circuitry coupled to the multiplexing pin and configured to output the voltage value; and
an external circuitry coupled to the multiplexing pin via a node, the external circuitry comprising a first multiplexer having an output coupled to the node and a second multiplexer having an output coupled to the node, wherein the first press key is coupled to a select input of the first multiplexer and the second press key is coupled to a select input of the second multiplexer, a first multiplexed input of the first multiplexer is coupled to a ground voltage via a first resistor and a second multiplexed input of the first multiplexer is floated, and a third multiplexed input of the second multiplexer is coupled to a first voltage source via a second resistor and a fourth multiplexed input of the second multiplexer is floated, wherein when the first press key and the second press key are not pressed, the node is floated and a first voltage value on the multiplexing pin is formed by detection states of the internal circuitry, when the first press key is pressed and the second press key is not pressed, the node is coupled to the ground voltage via the first resistor to form a second voltage value on the multiplexing pin according to the detection states of the internal circuitry, when the first press key is not pressed and the second press key is pressed, the node is coupled to the first voltage source via the second resistor to form a third voltage value on the multiplexing pin according to the detection states of the internal circuitry, when the first press key and the second press key are pressed, the node is coupled to the ground voltage via the first resistor and coupled to the first voltage source via the second resistor to form a fourth voltage value on the multiplexing pin according to the detection states of the internal circuitry, the control chip is configured to identify that the first press key and the second press key are not pressed when the voltage detection circuit detects the first voltage value, the control chip is configured to identify that the first press key is pressed and the second press key is not pressed when the voltage detection circuit detects the second voltage value, the control chip is configured to identify that the first press key is not pressed and the second press key is pressed when the voltage detection circuit detects the third voltage value, and the control chip is configured to identify that the first press key and the second press key are pressed when the voltage detection circuit detects the fourth voltage value.

5. The human interface device as claimed in claim 4, wherein the human interface device is a mouse.

6. The human interface device as claimed in claim 4, wherein the internal circuitry comprises a first control switch, a third resistor, a second control switch and a fourth resistor; and the control chip is configured to control the detection states of the internal circuitry to couple the multiplexing pin
to the ground voltage via the third resistor and the first control switch, or
to a second voltage source via the fourth resistor and the second control switch.

7. The human interface device as claimed in claim 6, wherein the first voltage source is higher than the second voltage source;
the first resistor and the second resistor have an identical first resistance;

the third resistor and the fourth resistor have an identical second resistance; and the first resistance is smaller than the second resistance.

8. A human interface device, comprising:

a first press key and a second press key;

a control chip comprising:

a voltage detection circuit configured to detect a voltage value to accordingly identify states of the first press key and the second press key simultaneously according to one detected voltage value;

a multiplexing pin configured as one input terminal coupled to the voltage detection circuit in the control chip, and an internal circuitry coupled to the multiplexing pin and configured to output the voltage value; and an external circuitry coupled to the multiplexing pin via a node, the external circuitry comprising a first multiplexer having an output coupled to the node and a second multiplexer having an output coupled to the node via a connect resistor, wherein the first press key is coupled to a select input of the first multiplexer and the second press key is coupled to a select input of the second multiplexer, a first multiplexed input of the first multiplexer is coupled to a ground voltage via a first resistor and a second multiplexed input of the first multiplexer is floated, and a third multiplexed input of the second multiplexer is coupled to the ground voltage via a second resistor and a fourth multiplexed input of the second multiplexer is floated, wherein when the first press key and the second press key are not pressed, the node is floated and a first voltage value on the multiplexing pin is formed by detection states of the internal circuitry, when the first press key is pressed and the second press key is not pressed, the node is coupled to the ground voltage via the first resistor to form a second voltage value on the multiplexing pin according to the detection states of the internal circuitry, when the first press key is not pressed and the second press key is pressed, the node is coupled to the ground voltage via the second resistor and the connect resistor to form a third voltage value on the multiplexing pin according to the detection states of the internal circuitry, when the first press key and the second press key are pressed, the node is coupled to the ground voltage via a first branch having the first resistor and a second branch having the second resistor and the connect resistor to form a fourth voltage value on the multiplexing pin according to the detection states of the internal circuitry, the control chip is configured to identify that the first press key and the second press key are not pressed when the voltage detection circuit detects the first voltage value, the control chip is configured to identify that the first press key is pressed and the second press key is not pressed when the voltage detection circuit detects the second voltage value, the control chip is configured to identify that the first press key is not pressed and the second press key is pressed when the voltage detection circuit detects the third voltage value, and the control chip is configured to identify that the first press key and the second press key are pressed when the voltage detection circuit detects the fourth voltage value.

9. The human interface device as claimed in claim 8, wherein the internal circuitry comprises a first control switch, a first internal resistor, a second control switch and a second internal resistor;

the control chip is configured to control the detection states of the internal circuitry to couple the multiplexing pin to a voltage source via the first internal resistor and the first control switch, or via the second internal resistor and the second control switch.

10. The human interface device as claimed in claim 9, wherein a resistance of the first internal resistor is twice of that of the second internal resistor, and a resistance of the second internal resistor is larger than that of the first and second resistors.

* * * * *